(12) United States Patent
Groves et al.

(10) Patent No.: US 7,978,804 B2
(45) Date of Patent: Jul. 12, 2011

(54) LOW POWER NEUTRON GENERATORS

(75) Inventors: Joel L. Groves, Leonia, NJ (US); Harold Pfutzner, Richmond, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 816 days.

(21) Appl. No.: 11/953,333

(22) Filed: Dec. 10, 2007

(65) Prior Publication Data

US 2009/0146052 A1    Jun. 11, 2009

(51) Int. Cl.
*G21B 1/00* (2006.01)
(52) U.S. Cl. .................... 376/108; 376/114
(58) Field of Classification Search ........... 250/493.1, 250/359.1, 390.01, 269.4, 370.11; 376/108, 376/113, 144, 109, 116
See application file for complete search history.

(56) References Cited

U.S. PATENT DOCUMENTS

| | | | |
|---|---|---|---|
| 3,546,512 A | 12/1970 | Frentrop | |
| 3,558,967 A * | 1/1971 | Miriam | 315/3.5 |
| 3,594,885 A * | 7/1971 | Miram et al. | 445/47 |
| 3,614,440 A * | 10/1971 | Carr | 250/423 R |
| 3,660,715 A | 5/1972 | Post | |
| 3,756,682 A | 9/1973 | Frentrop | |
| 3,775,216 A | 11/1973 | Frentrop | |
| 3,794,875 A * | 2/1974 | Stark | 376/109 |
| 4,090,086 A | 5/1978 | Cranberg | |
| 4,119,858 A | 10/1978 | Cranberg | |
| 4,269,659 A | 5/1981 | Goldberg | |
| 4,282,440 A * | 8/1981 | Givens | 313/362.1 |
| 4,310,765 A * | 1/1982 | Givens | 250/493.1 |
| 4,311,912 A * | 1/1982 | Givens | 376/109 |
| 4,352,043 A * | 9/1982 | Rigden | 315/1 |
| 4,529,571 A * | 7/1985 | Bacon et al. | 376/144 |
| 4,996,017 A * | 2/1991 | Ethridge | 376/116 |
| 5,198,677 A | 3/1993 | Leung et al. | |
| 5,233,269 A * | 8/1993 | Lien | 315/5.37 |
| 5,293,410 A * | 3/1994 | Chen et al. | 376/108 |
| 5,315,121 A | 5/1994 | Kluge et al. | |
| 5,317,233 A * | 5/1994 | Lien et al. | 315/5.37 |
| 5,589,736 A * | 12/1996 | Lien et al. | 315/5.43 |
| 5,745,536 A | 4/1998 | Brainard et al. | |
| 6,141,395 A | 10/2000 | Nishimura et al. | |
| 6,297,507 B1 * | 10/2001 | Chen et al. | 250/370.11 |
| 6,985,553 B2 | 1/2006 | Leung et al. | |
| 7,139,349 B2 | 11/2006 | Leung | |
| 7,663,119 B2 * | 2/2010 | Sved | 250/390.01 |
| 2007/0295911 A1 * | 12/2007 | Sved | 250/359.1 |
| 2009/0108192 A1 * | 4/2009 | Groves | 250/269.4 |
| 2009/0135982 A1 * | 5/2009 | Groves | 376/113 |

* cited by examiner

*Primary Examiner* — Nikita Wells
*Assistant Examiner* — Johnnie L Smith
(74) *Attorney, Agent, or Firm* — Kevin P. McEnaney; Jonna T. Flores; Darla P. Fonseca

(57) ABSTRACT

A neutron generator and method of constructing the same. The generator includes a grid configured to produce an ionizable gas when heated by electrons impinging thereon. A cathode emits electrons to heat the grid and to collide with produced ionizable gas atoms to generate ions. Neutrons are generated from a collision of ions impinging on a target in the generator. A tool for subsurface use incorporating the neutron generator.

25 Claims, 4 Drawing Sheets

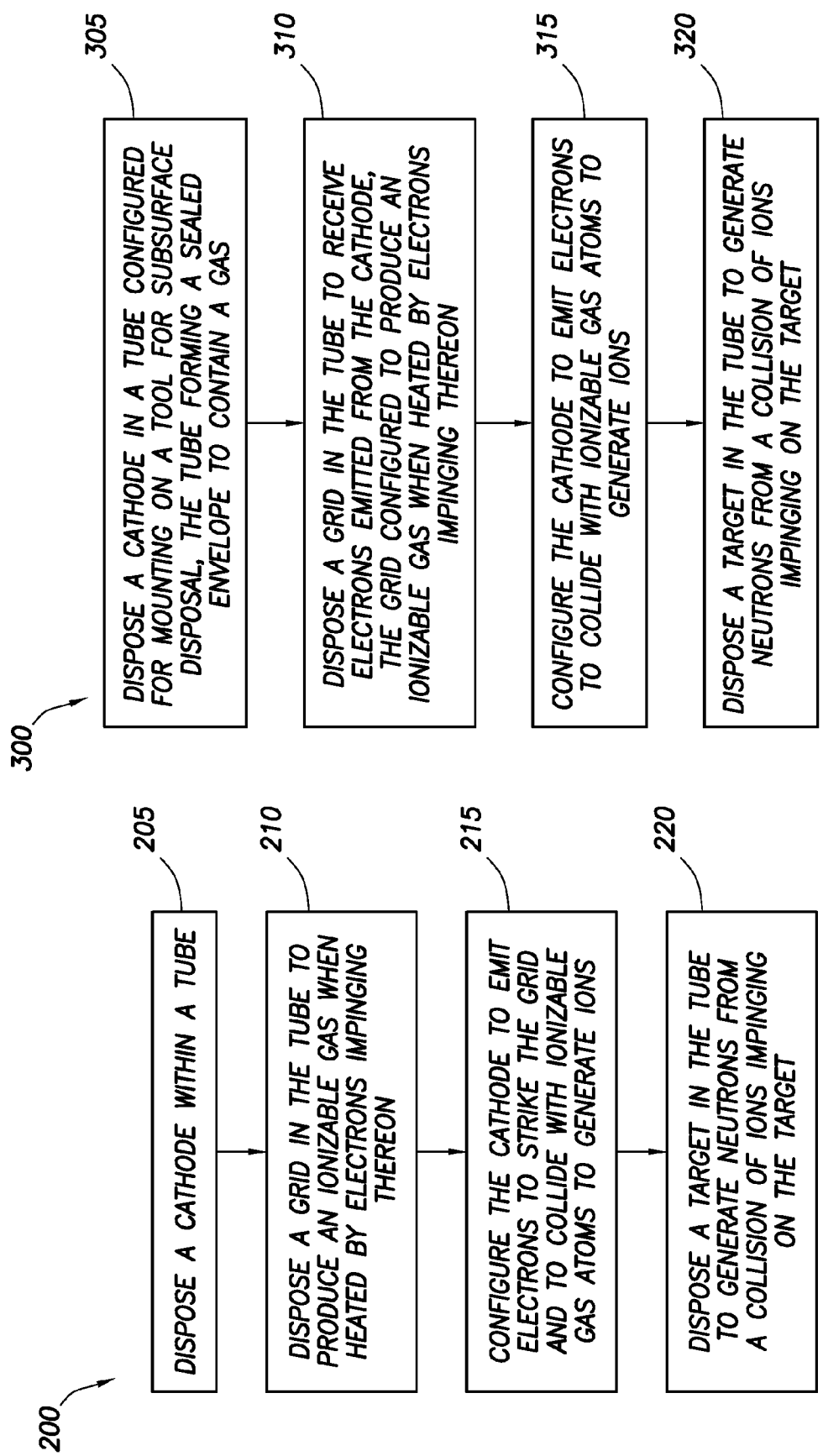

LOW POWER NEUTRON GENERATORS

BACKGROUND

1. Technical Field

This invention relates generally to apparatus for generating neutrons and in particular to neutron generators for subsurface applications.

2. Description of Related Art

The characteristics of geological formations are of significant interest in the exploration for, production and monitoring of subsurface water, oil and gas. To that end, a variety of techniques have been developed to measure subsurface characteristics and evaluate the obtained data to determine the petrophysical properties of interest. These techniques typically involve the subsurface deployment of tools or instruments equipped with sources adapted to emit energy into the formations (usually through a borehole traversing the formations). The emitted energy interacts with the surrounding formations to produce signals that are detected and measured by one or more sensors or detectors on the instrument. By processing the detected signal data, a profile or log of the subsurface properties is obtained.

A variety of logging techniques have been developed to evaluate subsurface formations. A number of such techniques involve emitting neutrons into the formation and evaluating the results of neutron interactions with formation nuclei. Neutrons have no electric charge and their mass is similar to that of a proton. The lack of charge allows neutrons to penetrate into formations. This property of neutrons makes it ideal for subsurface logging applications. In the formation, neutrons interact with matter in a wide variety of ways. The characteristics of some of these interactions can be used to measure the formation properties.

Various types of radiation sources have been used in subsurface logging systems. For example, neutrons or gamma rays may be generated simply through the use of radioactive isotopes (which naturally decay over time), an x-ray source may be used or neutrons may be generated in an electronic device utilizing a nuclear reaction generating neutrons on demand. U.S. Pat. Nos. 3,255,353, 4,810,459, 4,879,463 and 4,904,865 describe logging instruments equipped with active radiation sources and appropriate sensors. For neutron logging, the chemical source has the advantage of being virtually indestructible. It has no electronic parts, so it can be relied upon to always produce neutrons (zero downtime). However, this is also a disadvantage of the chemical source. Because the emission of neutrons cannot be shut off, strict radioactive safety procedures must be followed when handling the source and the instrument containing the source. This disadvantage prompted the development of electronic neutron sources.

High-energy neutrons may be generated through the controlled collision of energized particles by using a nuclear fusion reaction. Such a system is commonly referred to as a neutron generator. The generation of neutrons on demand by the use of energetic particle beams allows the construction of a neutron source which emits neutrons in bursts of well-determined duration and time sequences. One such pulsed neutron generator is described in U.S. Pat. No. 5,293,410. The neutron generator described in the '410 patent uses an accelerator tube in which charged particles, such as Deuterium ions, are accelerated through an electric-static potential and collide with a target element such as Tritium. The reaction of the Deuterium ions with the Tritium target produces almost monoenergetic neutrons at an energy level of about 14 MeV. In most applications the neutrons are not emitted continuously but in short bursts of well-defined durations and in repetitive sequences. When using such a pulsed neutron generator, the formation surrounding the instrument is subjected to repeated, discrete "bursts" of neutrons. U.S. Pat. Nos. 4,501,964, 4,883,956, 4,926,044, 4,937,446, 4,972,082, 5,434,408, 5,105,080, 5,235,185, 5,539,225, 5,219,518 and 5,608,215 describe logging instruments equipped with neutron generators.

FIG. 1 shows a "hot cathode" electronic neutron generator 10. These generators 10 usually have three major features:
(i) a gas source to supply the reacting substances, such as Deuterium ($H^2$) and Tritium ($H^3$);
(ii) an ion source comprising usually at least one anode and a cathode to emit electrons; and
(iii) an accelerating gap to impel produced ions to a target to generate nuclear reactions with energy expressed in millions of electron volts (MeV).

The neutron generator 10 of FIG. 1 uses a gas source 12 formed from a helically wound filament 14 coated with Zirconium, which when heated releases the gas. Under typical operating conditions, the filament 14 is heated by electric current to trigger the gas release, a cathode 16 is heated by electric current, and the emitted electrons are accelerated through an electric field to create an ion beam to strike a target 18 and generate neutrons. This conventional generator design requires a fair amount of electrical energy to power its components.

Many potential neutron generator applications require operation with a battery pack as a power source. Additionally, space applications of neutron generators for elemental surveys of planets and asteroids need systems that operate on as little power as possible. Conventional neutron generators have rather high power requirements. A need remains for improved neutron generators that require less power to operate.

SUMMARY

One aspect of the invention provides a neutron generator for subsurface use. The generator includes a grid configured to produce an ionizable gas when heated by electrons impinging thereon; a cathode configured to emit electrons to heat the grid and collide with ionizable gas atoms to generate ions; and a target to generate neutrons from a collision of ions impinging on the target.

Another aspect of the invention provides a neutron generator for subsurface use. The generator includes a tube forming a sealed envelope to contain a gas; a grid disposed within the tube to produce an ionizable gas when heated by electrons impinging thereon; a cathode disposed within the tube to emit electrons to heat the grid and collide with ionizable gas atoms to generate ions; and a target disposed within the tube to generate neutrons from a collision of ions impinging on the target.

Another aspect of the invention provides a tool for subsurface use incorporating a neutron generator. The neutron generator includes a tube forming a sealed envelope to contain a gas; a grid disposed within the tube to produce an ionizable gas when heated by electrons impinging thereon; a cathode disposed within the tube to emit electrons to heat the grid and collide with ionizable gas atoms to generate ions; and a target disposed within the tube to generate neutrons from a collision of ions impinging on the target.

Another aspect of the invention provides a method for constructing a neutron generator for subsurface use. The method includes disposing a cathode within a tube; disposing a grid within the tube to produce an ionizable gas when heated by electrons impinging thereon; configuring the cathode to emit electrons to strike the grid and to collide with ionizable gas atoms to generate ions; and disposing a target within the tube to generate neutrons from a collision of ions impinging on the target.

Another aspect of the invention provides a method for constructing a neutron generator for subsurface use. The method includes disposing a cathode within a tube configured for mounting on a tool for subsurface disposal, the tube forming a sealed envelope to contain a gas; disposing a grid within the tube to receive electrons emitted from the cathode, the grid configured to produce an ionizable gas when heated by electrons impinging thereon; configuring the cathode to emit electrons to collide with ionizable gas atoms to generate ions; and disposing a target within the tube to generate neutrons from a collision of ions impinging on the target.

BRIEF DESCRIPTION OF THE DRAWINGS

Other aspects and advantages of the invention will become apparent upon reading the following detailed description and upon reference to the drawings in which like elements have been given like numerals and wherein:

FIG. 4 shows a flow chart of a method for constructing a neutron generator according to aspects of the invention.

FIG. 5 shows another flow chart of a method for constructing a neutron generator according to aspects of the invention.

DETAILED DESCRIPTION

Figure 1:
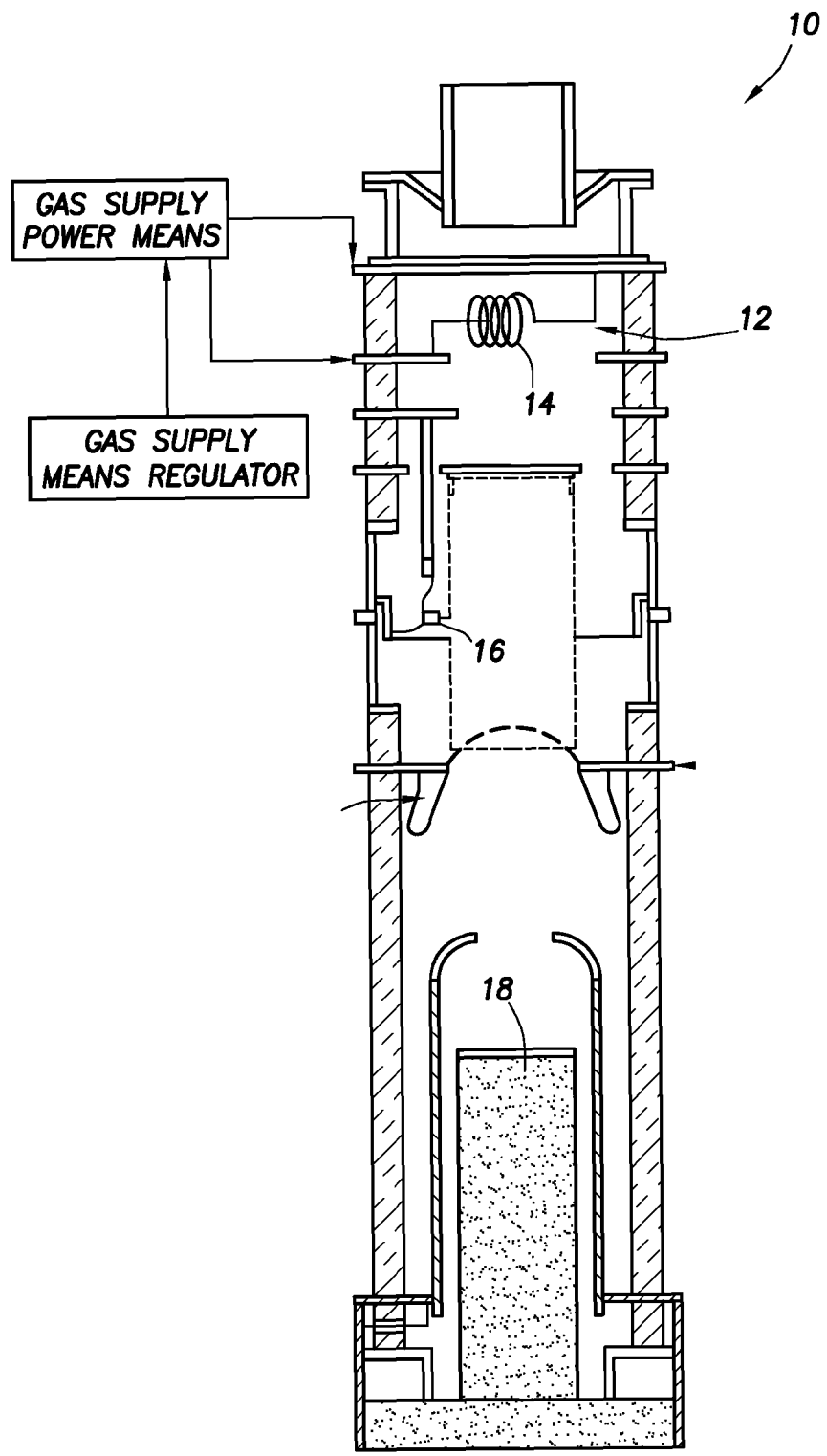
FIG. 1 is a schematic of a conventional neutron generator.
Figure 2:
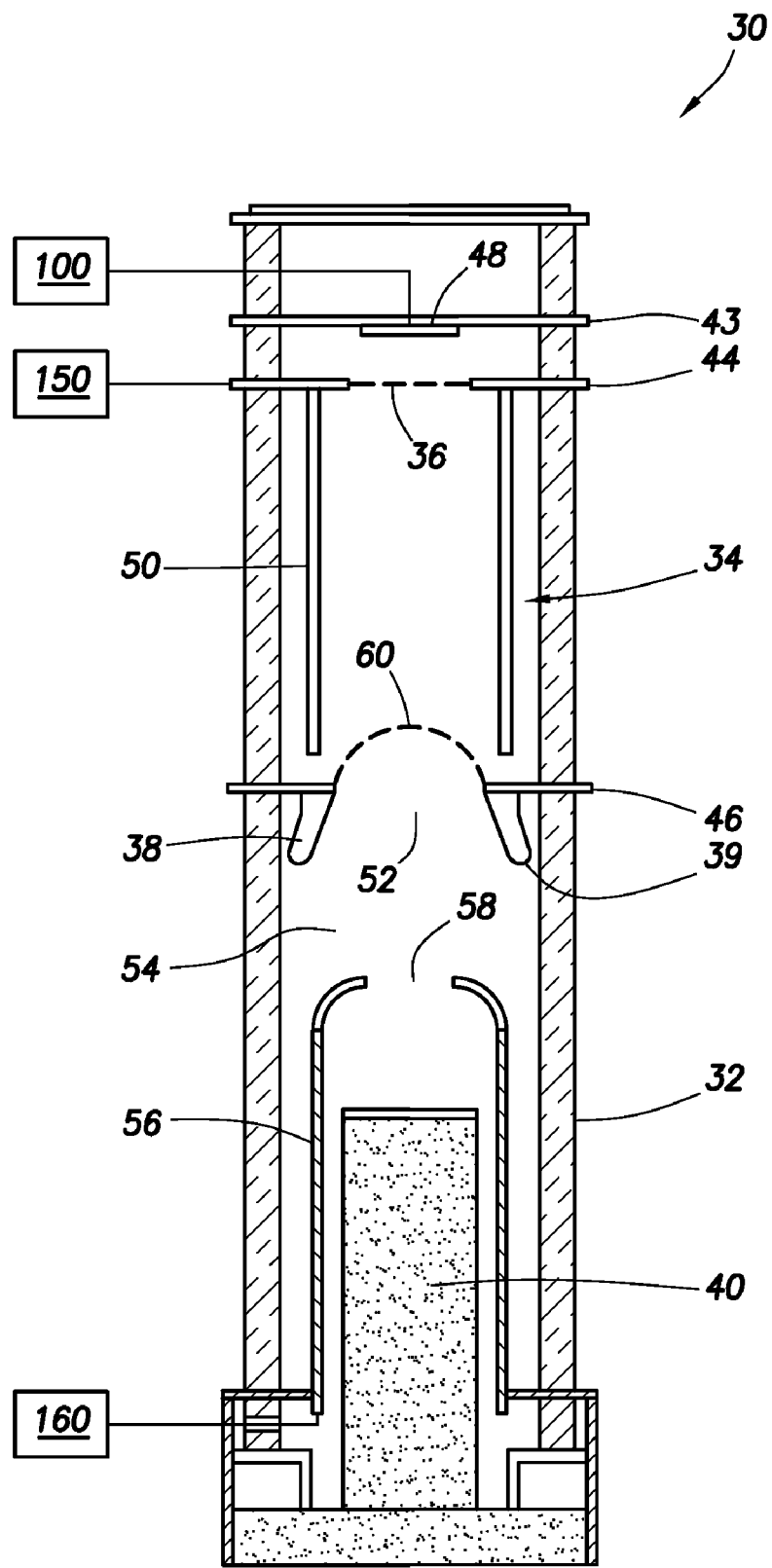
FIG. 2 is a schematic of a neutron generator design according to aspects of the invention.

FIG. 2 shows an aspect of the invention. A neutron generator 30 generally comprising a structure similar to the generator described in U.S. Pat. No. 5,293,410 (assigned to the present assignee and entirely incorporated herein by reference) is shown. The generator 30 includes a hollow cylindrical tube 32 made of a suitable material and providing a gastight housing, an ion source tube 34, a gas supply grid 36, an extractor electrode 38, a target electrode 40, and a cathode 48. The tube 32 comprises parallel transversely disposed flanges 43, 44, 46 providing electrically conductive paths and sturdy support for the generator components as described herein.

The ion source tube 34 comprises a cylindrical hollow electrode 50 aligned with the longitudinal axis of the generator 30 and made out of a mesh or coil. The electrode 50 is secured rigidly to flange 44 (e.g., by conductive pads). The electrode 50 is configured to provide several functions.

A portion of the electrode 50 comprises a grid 36 disposed transversely to the longitudinal axis of the generator, near the cathode 48. The grid 36 provides a gas supply for the generator 30. The grid 36 comprises a planar mesh or screen coated with a material that releases ionizable Deuterium and Tritium gases when heated. The grid 36 may be formed from any suitable materials with a high melting temperature such as Tungsten or Rhenium or alloys thereof. The grid 36 may be coated with a film formed using Titanium, Scandium, or Zirconium, for example. The coating(s) may be applied on the grid 36 using any techniques known in the art. In the aspect shown in FIG. 2, the grid 36 is shown positioned in front of the cathode 48 at one end of the ion source tube 34. Other aspects may be configured with the grid 36 positioned within the hollow portion of the electrode 50 (not shown).

The grid 36 also facilitates electron emission, accelerating electrons from the cathode 48 toward the grid 36. The elongated hollow portion of the electrode 50 shapes an electric field in the ion source region to expel ions out of the ion source tube 34. The grid 36 segment and the hollow portion of the electrode 50 are electrically connected and operated at the same voltage. A voltage (either direct or pulsed current) in the range of a few hundred volts may be applied to the electrode 50.

In the aspect shown in FIG. 2, the cathode 48 is disposed close to one end of the electrode 50. The cathode 48 comprises an electron emitter consisting of a block of material susceptible, when heated, to emit electrons. The cathode 48 emitter is affixed to flange 43 and coupled to a cathode heater current means 100 to provide the power for heating the emitter as known in the art. In other aspects of the invention, the cathode 48 can be configured with more than one emitter element or with an emitter disposed inside the hollow electrode 50 (not shown).

In some aspects, the cathode 48 comprises a thermionic cathode. Thermionic cathodes are heated cathodes, as opposed to cold cathodes which emit electrons without being heated. When implemented with a thermionic cathode 48, the cathode is preferably of the "dispenser" or "volume" type. A dispenser cathode used in a hydrogen environment maximizes electron emissions per unit of heater power compared to other thermionic type cathodes, while operating at a moderate temperature. Aspects of the cathode emitter block comprise a substrate made of porous Tungsten, impregnated with a material susceptible to emit electrons, such as compounds made with combinations of, e.g., Barium Oxide and Scandium Oxide. Each cathode has different susceptibility to their operating environment (gas pressure and gas species). Dispenser cathodes are known to be demanding in terms of the vacuum requirements and care needed to avoid contamination. Aspects of the invention are implemented with a dispenser cathode disposed in a Deuterium or Tritium gas environment within the generator housing. This configuration provides several hundred hours of electron emission current yet requires only a few watts of heater power. The cathode 48 is provided with cathode heater current 100 which is distinct from the ion source tube 34 voltage supply 150. This implementation permits better control of both heater current means 100 and voltage supply 150.

The generator 30 is also incorporated with an extractor electrode 38 disposed at the end of the ion source tube 34, facing the target electrode 40 at one end of the tube 32. The extractor electrode 38 is supported by a flange 46. The extractor electrode 38 comprises an annular body (e.g., made of Nickel or an alloyed metal) and is in alignment with the longitudinal axis of the tube 32. A central aperture 52 in the electrode 38 body diverges outwardly in a direction away from the ion source tube 34 to produce a torus-shaped contour 39 at the end of the body facing the target electrode 40.

The extractor electrode 38 provides one of the electrodes for an accelerating gap 54 that impels ionized Deuterium and Tritium particles from the ion source tube 34 toward the Deuterium- and Tritium-filled target 40. The target 40 includes a thin film of Titanium or Scandium deposited on the surface of the target electrode 40, facing the ion source tube 34.

The potential that accelerates the ions to the target 40 is established, to a large extent, between the extractor electrode 38 and a suppressor electrode 56. The suppressor electrode 56 is a concave member that is oriented toward the target electrode 40 and has a centrally disposed aperture 58 which enables the accelerated ions in the gap 54 to impinge on the target 40. The suppressor electrode 56 is connected to a high voltage supply means 160. In order to prevent electrons from being extracted from the target 40 upon ion bombardment ("secondary electrons"), the suppressor electrode 56 is preferably at a negative voltage with respect to the voltage of the target electrode 40.

Aspects of the invention may also be implemented with a cut-off electrode 60 added to the extractor 38. As described in U.S. Pat. No. 5,293,410, slow moving ions tend to generate a tail in the neutron pulse at the moment the voltage pulse is turned off, which is detrimental to the pulse shape. A cut-off electrode 60 provides a remedy for this situation. The electrode 60 may be in the form of a mesh screen, which is fixed at the aperture 52 of the extractor electrode 38, facing the ion source tube 34. The cut-off electrode 60 may be made of high transparency Molybdenum mesh. The cut-off electrode 60 is subjected to voltage pulses synchronized with and complementary to the voltage pulses applied to the anode 50. The pulses applied to cut-off electrode 60 are positive. In another aspect, the cut-off electrode 60, instead of being subjected to voltage pulses, may be maintained at a positive voltage (e.g., a few volts). This low positive voltage prevents the slow ions produced at the end of the pulse in the ion source from leaving the ion source, which provides a sharp cut-off at the end of the neutron pulse (i.e., a short fall time). The cut-off electrode 60 is preferably made of a metallic grid in the form of a truncated sphere, and its concavity turned towards the target 40. Part of the electrode 60 mesh screen might protrude inside the cylindrical hollow anode 50.

In order to generate a controlled output of neutrons, continuously or in recurrent bursts, ion source tube 34 voltage supply means 150 provides power for the bombarding ion beam. For pulsed operation, an ion source pulser may be provided at the output of the ion source voltage supply 150 to regulate its operation. In this aspect, the ion source pulser has a direct output connected to the electrode 50 and a complementary output connected to extractor electrode 38. The high voltage supply 160, the ion source voltage supply 150, and the ion source pulser may be of any suitable type as known in the art (e.g., described in U.S. Pat. Nos. 3,756,682, 3,546,512 or 5,293,410).

As previously described, the ionizable gas supply for the generator 30 is provided by the grid 36. During operation, some electrons in the electron beam current emitted from the cathode 48 strike the grid 36 in its path causing it to heat up. Other electrons pass through the open spaces in the grid 36 to collide with the ionizable gas atoms. The heated grid 36 releases Deuterium and Tritium gases, achieving a pressure within the generator housing envelope that is adequate to obtain a desired ion beam current for the generator 30 to operate. Since gas release from the grid 36 is activated by heating of the grid, the cathode heater current can be used to control the ion beam current, and thus neutron generation. For example, an aspect of the invention can be configured with fixed high voltage and electrode 50 voltage such that the ion beam current on target 40 will be a function of the cathode 48 heater current, the temperature profile of the grid 36, and the amount of Deuterium and Tritium added to the tube 32. If the neutron output should increase as a result of an increase in the cathode electron emission, the cathode heater current can be regulated to decrease the electron beam on the grid and thereby reduce the gas pressure within the generator. The lower gas pressure in effect decreases the number of ions available for acceleration, and thus restores the neutron output to a stable, regulated value. In another aspect of the invention, the amount of Deuterium and Tritium gas added to the tube can be used to determine the range of ion beam current over which the generator will operate. For example, in an aspect where the Deuterium and Tritium gas content within the housing volume is such that the cathode 48 is heated to emit 20 mA of electrons that are accelerated through 240 volts, the cathode heater current can be regulated to control the ion beam current (e.g., over a range of 0-100 μA).

If desired, the neutron output can be monitored directly, and either the anode electrode 50 voltage supply or the high voltage power supply can be controlled automatically or manually to achieve stable neutron output. In the event the generator 30 is supplied only with Deuterium gas, neutrons are produced as a result of Deuterium-Deuterium interactions, rather than the Deuterium-Tritium reactions considered in the foregoing description.

The high voltage established between the extractor electrode 38 and the suppressor electrode 56 produces a steep voltage gradient that accelerates Deuterium and Tritium ions from the electrode aperture 52 in extractor electrode 38 toward the target 40. The energy imparted to the ions is sufficient to initiate neutron generating reactions between the bombarding ions and the target nuclei and to replenish the target 40 with fresh target material.

Figure 3:
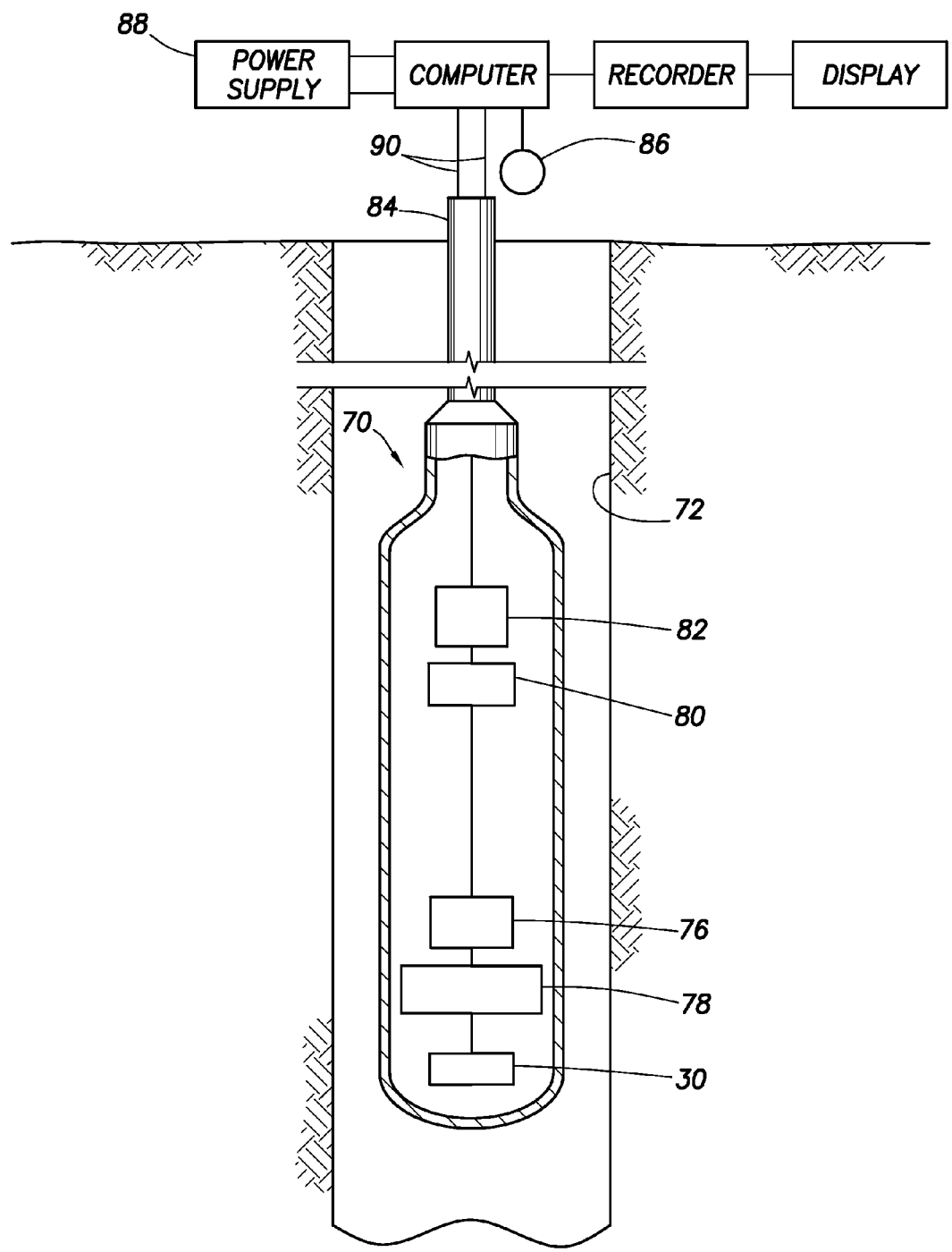
FIG. 3 is a schematic of a downhole tool incorporating a neutron generator design according to aspects of the invention.

FIG. 3 shows another aspect of the invention. A downhole tool 70 is disposed in a borehole 72 that penetrates a subsurface formation. The tool 70 might be, for example, of the type described in U.S. Pat. Nos. 7,073,378, 5,884,234, 5,067,090 and 5,608,215 (all assigned to the present assignee and entirely incorporated herein by reference). The tool 70 includes a neutron generator 30 of the invention, which emits successive pulses of neutrons into the formations surrounding the borehole 72. Radiation resulting from interactions between the neutrons and formation nuclei is detected by a nuclear detector 76. Appropriate shielding 78 is interposed between the detector 76 and the neutron generator 30 to reduce the undesired direct flux of radiation. Output signals from the detector 76 are typically passed by electronics/circuitry 80 for analysis and transmitted to a computer 82 as known in the art. Though not illustrated in FIG. 3 aspects of the neutron generator 30 may be implemented with a multi-housing structure comprising an inner tube (such as sealed tube 32) contained within another housing (which may hold power supplies, additional gases, etc.), which can be further contained in a third housing (which may be configured to protect its contents from external pressure and house additional components).

The tool 70 is shown supported in the borehole 72 by a carrier 84, which can be a wireline system (e.g., slickline, logging cable, coiled tubing, etc.) or a drill string in the case of a while-drilling system. With a wireline tool, the tool 70 is raised and lowered in the borehole 72 by a winch 86, which is controlled by the surface equipment 88. The carrier 84 includes conductors 90 that connect the downhole electronics and neutron generator 30 with the surface equipment 88 for signal/data/power and control communication. Alternatively with drill string or slickline logging cable, the power may be supplied downhole, the signals/data may be processed and/or recorded in the tool 70 and the processed data transmitted by various means to the surface equipment 88.

FIG. 4 shows a flow chart of a method 200 according to the invention for constructing a neutron generator. In one aspect, at step 205 a method entails disposing a cathode 48 within a tube. At step 210, a grid 36 is disposed within the tube to produce an ionizable gas when heated by electrons impinging thereon. At step 215, the cathode is configured to emit electrons to strike the grid and to collide with ionizable gas atoms to generate ions. At step 220, a target 40 is disposed within the tube to generate neutrons from a collision of ions impinging on the target.

FIG. 5 shows a flow chart of a method 300 according to the invention for constructing a neutron generator. In one aspect, at step 305 a method entails disposing a cathode 48 within a tube configured for mounting on a tool 70 for subsurface disposal, the tube forming a sealed envelope to contain a gas. At step 310, a grid 36 is disposed within the tube to receive electrons emitted from the cathode, the grid configured to produce an ionizable gas when heated by electrons impinging thereon. At step 315, the cathode is configured to emit electrons to collide with ionizable gas atoms to generate ions. At step 320, a target 40 is disposed within the tube to generate neutrons from a collision of ions impinging on the target. Aspects of the methods 200, 300 may be implemented using any of the configurations and techniques disclosed herein.

It will be apparent to those skilled in the art that aspects of the invention may be implemented using general-purpose computers having appropriate hardware and programmed with software to perform the techniques disclosed herein. The programming may be accomplished through the use of one or more program storage devices readable by the computer processor(s) and encoding one or more software programs of instructions executable by the computer for performing the operations described herein. The program storage device may take the form of, e.g., one or more floppy disks; a CD ROM or other optical disk; a magnetic tape; a read-only memory chip (ROM), and other forms of the kind well known in the art or subsequently developed. The program of instructions may be "object code," i.e., in binary form that is executable more-or-less directly by the computer, in "source code" that requires compilation or interpretation before execution; or in some intermediate form such as partially compiled code. The precise forms of the program storage device and of the encoding of instructions are immaterial here. Thus these processing means may be implemented in the surface equipment, in the system tools, in a location remote from the well site (not shown), or shared by these means as known in the art. Aspects of the invention may also be implemented using conventional display means situated as desired to display processed or raw data/images as known in the art.

While the present disclosure describes specific aspects of the invention, numerous modifications and variations will become apparent to those skilled in the art after studying the disclosure, including use of equivalent functional and/or structural substitutes for elements described herein. For example, it will be appreciated that the disclosed instrument configurations can be implemented with various additional types of sources and sensors to perform a variety of subsurface measurements (besides nuclear-type measurements). It will also be appreciated that the disclosed aspects can be implemented with conventional electronics, sensors, hardware, circuitry, housings and materials as known in the art. Systems implemented with the disclosed configurations for use in wireline, slickline, production logging, LWD/MWD, LWT, marine environments, and reservoir monitoring are all possible venues for applications of this invention. All such similar variations apparent to those skilled in the art are deemed to be within the scope of the invention as defined by the appended claims.

What is claimed is:

1. A low power neutron generator for subsurface use, comprising:
    a cathode configured to emit electrons to heat a grid configured to produce an ionizable gas when heated by the electrons impinging thereon and to cause emitted electrons to collide with ionizable gas atoms to generate ions; and
    an accelerating potential configured to accelerate the generated ions onto
    a target configured to generate neutrons from a collision of ions impinging on the target.

2. The neutron generator of claim 1, wherein the grid is coated with a material that releases an ionizable gas when heated.

3. The neutron generator of claim 1, wherein the grid is positioned in a direct path to receive electrons emitted from the cathode.

4. The neutron generator of claim 1, wherein the cathode is configured to receive an adjustable current.

5. The neutron generator of claim 1, wherein the generator comprises a tube housing enclosing the grid, cathode, and target.

6. The neutron generator of claim 5, wherein the tube comprises a sealed envelope to contain ionizable gas released by the grid.

7. The neutron generator of claim 5, further comprising Deuterium or Tritium gas disposed within the tube.

8. A neutron generator for subsurface use, comprising:
    a tube forming a sealed envelope to contain a gas;
    a grid disposed within the tube to produce an ionizable gas when heated by electrons impinging thereon;
    a cathode disposed within the tube to emit electrons to heat the grid and cause emitted electrons to collide with ionizable gas atoms to generate ions; and
    an accelerating potential configured to accelerate the generated ions onto
    a target disposed within the tube to generate neutrons from a collision of ions impinging on the target.

9. The neutron generator of claim 8, wherein the grid is coated with a material that releases an ionizable gas when heated.

10. The neutron generator of claim 8, wherein the grid is positioned in a direct path to receive electrons emitted from the cathode.

11. The neutron generator of claim 8, wherein the cathode is configured to receive an adjustable current.

12. The neutron generator of claim 8, wherein the tube comprises Deuterium or Tritium gas disposed therein.

13. A tool for subsurface use incorporating a neutron generator, the neutron generator comprising:
    a tube forming a sealed envelope configured to contain a gas;
    a grid disposed within the tube to produce an ionizable gas when heated by electrons impinging thereon;
    a cathode disposed within the tube to emit electrons configured to heat the grid and cause emitted electrons to collide with ionizable gas atoms to generate ions; and
    an accelerating potential configured to accelerate the generated ions onto
    a target disposed within the tube to generate neutrons from a collision of ions impinging on the target.

14. The tool of claim 13, wherein the grid is coated with a material that releases an ionizable gas when heated.

15. The tool of claim 13, wherein the grid is positioned in a direct path to receive electrons emitted from the cathode.

16. The tool of claim 13, further comprising an adjustable current supply for the cathode.

17. The tool of claim 16, further comprising a voltage supply for electrical components of the generator.

18. The tool of claim 13, wherein the tube comprises Deuterium or Tritium gas disposed therein.

19. A method for constructing a neutron generator for subsurface use, comprising:
disposing a cathode within a tube;
disposing a grid within the tube to produce an ionizable gas when heated by electrons impinging thereon;
configuring the cathode to emit electrons to strike the grid and to cause emitted electrons to collide with ionizable gas atoms to generate ions; and
disposing a target within the tube;
applying an accelerating potential configured to accelerate the generated ions onto the target to generate neutrons from a collision of ions impinging on the target.

20. The method of claim 19, further comprising coating the grid with a material that releases an ionizable gas when heated.

21. The method of claim 19, further comprising positioning the grid in a direct path to receive electrons emitted from the cathode.

22. The method of claim 19, further comprising coupling an adjustable current supply to the cathode.

23. The method of claim 22, further comprising coupling a voltage supply for electrical components of the generator.

24. The method of claim 19, further comprising disposing Deuterium or Tritium gas within the tube.

25. A method for constructing a neutron generator for subsurface use, comprising:
disposing a cathode within a tube configured for mounting on a tool for subsurface disposal, the tube forming a sealed envelope to contain a gas;
disposing a grid within the tube to receive electrons emitted from the cathode, the grid configured to produce an ionizable gas when heated by electrons impinging thereon;
configuring the cathode to emit electrons to collide with ionizable gas atoms to generate ions; and
disposing a target within the tube to generate neutrons from a collision of ions impinging on the target.

* * * * *